United States Patent [19]
Lee et al.

[11] Patent Number: 5,377,093
[45] Date of Patent: Dec. 27, 1994

[54] CURRENT SENSING CIRCUIT OF A SWITCHING MODE POWER SUPPLY

[75] Inventors: Kyu-Young Lee; Hong-Gook Bae, both of Suwon, Rep. of Korea

[73] Assignee: SamSung Electronics Co., Ltd., Suwon, Rep. of Korea

[21] Appl. No.: 997,029

[22] Filed: Dec. 28, 1992

[30] Foreign Application Priority Data

Nov. 27, 1992 [KR] Rep. of Korea ............... 1992-22624

[51] Int. Cl.$^5$ ............................................. H02M 7/00
[52] U.S. Cl. ................................. 363/97; 363/21; 363/131; 327/309; 327/544
[58] Field of Search ............ 307/540, 350, 573, 571, 307/296.3, 296.5, 296.6; 363/21, 95, 97

[56] References Cited

U.S. PATENT DOCUMENTS

| | | | |
|---|---|---|---|
| 3,290,433 | 12/1966 | De France | 307/540 |
| 3,315,033 | 4/1967 | Sennhenn et al. | 307/552 |
| 3,678,292 | 7/1972 | Hampel | 307/362 |
| 3,811,053 | 5/1974 | Habib | 307/565 |
| 4,359,650 | 11/1982 | Newcomb | 307/350 |
| 4,837,495 | 6/1989 | Zansky | 363/21 |
| 4,859,871 | 8/1989 | Kobayashi et al. | 307/264 |
| 4,975,823 | 12/1990 | Rilly et al. | 363/97 |
| 5,055,991 | 10/1991 | Carroll et al. | 363/21 |
| 5,089,947 | 2/1992 | Driscoll et al. | 363/21 |

FOREIGN PATENT DOCUMENTS 58-124373  7/1983  Japan .................... 358/172

Primary Examiner—Timothy P. Callahan
Assistant Examiner—Terry L. Englund
Attorney, Agent, or Firm—Robert E. Bushnell

[57] ABSTRACT

When a signal having a large shifted level is needed in a level shift circuit, a false operation is generated by the increase of noise level. And, when the signal level is very low, the circuit does not operate and generates distortion. The present circuit improves such problems. To do this, a capacitor or diode for coupling a signal generated from a signal source and level shifter for shifting the DC-coupled signal by a predetermined shift level is utilized. Accordingly, a variation of a small signal is transmitted without distortion to exactly and precisely control a device and noise level is reduced in a source signal transmission process, thereby preventing false operation of the device.

19 Claims, 6 Drawing Sheets

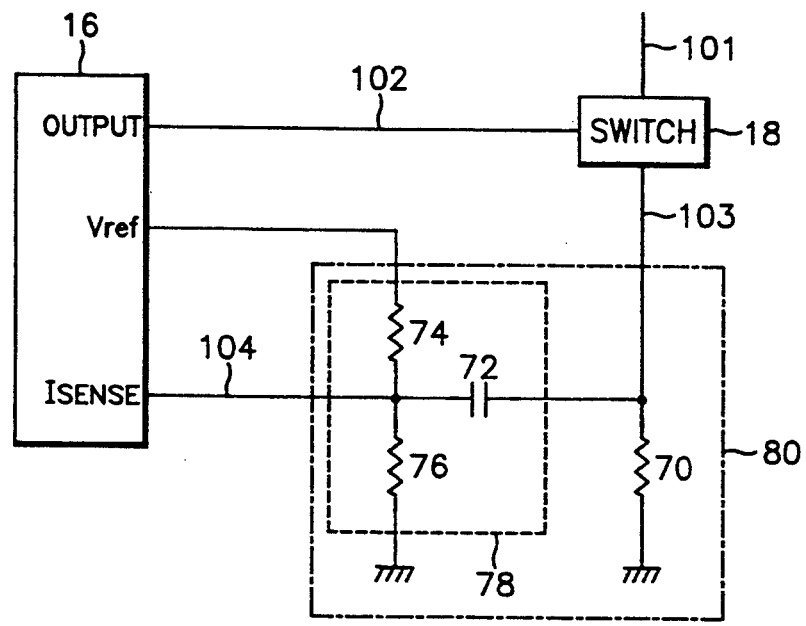
FIG. 11

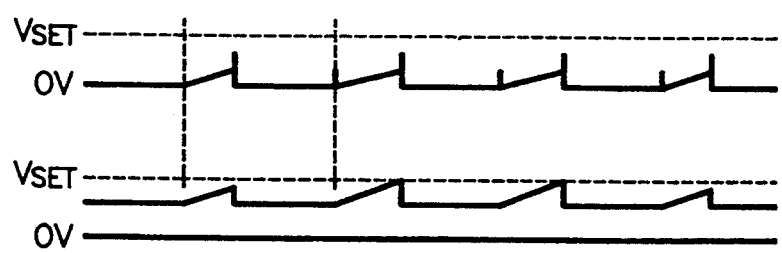
FIG. 12C
FIG. 12D

CURRENT SENSING CIRCUIT OF A SWITCHING MODE POWER SUPPLY

BACKGROUND OF THE INVENTION

The present invention relates to a level shift circuit and more particularly to a small signal level shift circuit for shifting the level of a small signal without distortion.

Generally, in circuits or devices for processing a signal generated from a signal source such as a sensor, a monitoring circuit, a signal generating circuit and a level sensing circuit, etc., the levels of the generated signals required in the above circuits are different. A signal level is shifted by a level required in a level shift circuit shown in FIG. 1. In FIG. 1, the collector terminal of transistor 2 is coupled to a power source voltage Vcc, its base terminal is coupled to a signal Vs generated from a signal source, and its emitter terminal is grounded through serially connected resistors 4 and 6, thereby obtaining an output signal Vo at a node between the resistors 4 and 6. If a signal Vs such as FIG. 2A is supplied to the base terminal of the transistor 2, the transistor 2 amplifies the signal Vs. At this time, at the node between resistors 4 and 6, a level shifted signal Vo such as FIG. 2B is generated by adding the amplified signal to a signal level obtained by dividing the power source voltage Vcc. Accordingly, the signal Vs is shifted by a predetermined voltage level $V_{SET}$.

As described above, the conventional level shift circuit generates the following problems according to the use of transistor. First, when a signal level is shifted largely, a transistor having a large small-signal current amplification rate $h_{fe}$ should be used. But, in this case, noise level is also increased, thereby generating a false operation, so that an extra circuit for preventing the false operation is needed. Secondly, when the signal level is very low, the transistor is in a cut-off region, so that the transistor does not operate. Thirdly, distortion caused by several operation characteristics of transistor is generated.

Meanwhile, in a switching mode power supply (hereinafter referred to as SMPS) widely used as power supply of several electric or electronic devices, signal transfer is needed, which is described in detail as follows. With reference to FIG. 3 showing an example of multi-output SMPS, a schematic operation useful for understanding of the present invention is described. An input rectifying circuit 12 rectifies an AC (alternating current) power source through an AC input power source 10 and supplies the rectified power source to a transformer 14 and a switching control unit 16. Generally, as the switching control unit 16, one-chip IC such as UC1842 which is a PWM controller of UNITRODE company in U.S.A. is used. The switching control, unit 16 is operated by the DC (direct current) power source supplied from the input rectifying circuit 12, thereby generating a pulse width modulation (hereinafter referred to as PWM) signal having a predetermined frequency. A switching circuit 18 coupled between a primary side of the transformer 14 and the switching control unit 16 induces power source at a secondary side of the transformer 14, by switching the DC power source supplied to the primary side of the transformer 14 in response to the PWM signal. The induced power source is rectified and smoothed in first and second output rectifying circuits 22 and 24, and then is supplied to a load through first and second DC output power sources 26 and 28, respectively. An insulating circuit 30 and a feedback circuit 32 feed back the output power source voltage of the second DC power source 28 to the switching control portion 16. According, the switching control unit 16 varies duty of PWM signal according, to the state of feedback voltage, thereby stabilizing the output power source.

And, a current sensing circuit 20 senses the state of the primary side current flowing through the switching unit 18 and supplies the sensed current state to the switching control unit 16. At this time, if current over a regulated value is sensed due to abnormality of input power source or the abnormality of load or SMPS, the switching control unit 16 is shut down, thereby stopping the generation of PWM signal to protect load or SMPS from overcurrent.

FIG. 4 is a diagram of a conventional current sensing circuit for sensing a current state of primary side as described above, where a switching control unit 16, a switching unit 18, a current sensing circuit 20, and lines 101 to 104 correspond to the corresponding circuits of the FIG. 3, respectively. The switching control unit 16 is constituted by a PWM controller as described above. A field effect transistor (hereinafter referred to as FET) 36 of the switching unit 18 switches a primary-side power source in response to a PWM signal, such as that of FIG. 5A, outputted from an output terminal OUTPUT of the switching control unit 16. In the line 101 which is a primary side of transformer 14, a voltage waveform such as FIG. 5B is shown by the FET 36. Resistors 32 and 34 are coupled between the output terminal OUTPUT of the switching control unit 16 and a gate terminal of the FET 36, to properly set on/off time of FET 36. A resistor 42 of the current sensing circuit 20 is a current sensing resistor, which limits current flowing through the FET 36 and at the same time, generates a voltage corresponding to the amount of current in the line 103. The generated voltage shows a waveform such as FIG. 5C and is supplied to a current sensing terminal $I_{SENSE}$ of the switching control unit 16 through a resistor 40 as a current sensing voltage having the waveform such as FIG. 5D.

Generally, a shut-down voltage where the switching control unit 16 senses overcurrent and is shut down is set as 1 V, and accordingly, a current sensing resistance Rs according to a maximum current Ismax for sensing overcurrent is determined by the following equation (1):

$$\text{Ismax} \sim 1.0V/R_s \tag{1}$$

Thus, if a current sensing voltage supplied to the current sensing terminal $I_{SENSE}$ of the switching control unit 16 through the resistor 40 reaches 1 V as the current passing through the FET 36 increases, the switching control unit 16 is shut down. At this time, since power proportional to the current flowing through the FET 36 is consumed on the resistor 42, heat loss is generated. For instance, when a maximum current Ismax where the current sensing voltage becomes 1 V, is 15A, a duty D of PWM signal is 0.8, and a resistance $R_{42}$ of resistor 42 is 65 mΩ, the power consumption Pt is given by the following equation (2):

$$Pt = I^2 \cdot R \cdot t \quad (2)$$
$$= Ismax^2 \times R_{42} \times D$$
$$= 15^2 \times (65 \times 10^{-3}) \times 0.8 = 11.7 \text{ W}$$

That is, to obtain the current sensing voltage of 1V, loss of 11.7 W is generated. Accordingly, when large current such as 15A is sensed, excessive heat loss is generated, so that additional radiating processing is required. Also, there is a problem in that the efficiency of SMPS is deteriorated by the generation of heat loss. Also, the resistor 42 should be a resistor having rated dissipation which is sufficiently large with respect to the power of 11.7 W, so that there are problems of occupying large space and raising the cost.

Accordingly, another current sensing circuit constituted by a transformer (troidal core transformer) 44 for sensing current by a magnetic element instead of the resistor 42, as shown in FIG. 6 is used. In FIG. 6, the switching control unit 16, the switching unit 18, the current sensing circuit 20, and the lines 101 to 104 correspond to the corresponding circuits of FIGS. 3 and 4, respectively. And, the switching unit 18 switches the primary-side power source in response to a PWM signal, such as FIG. 7A, outputted from the switching control unit 16 as described above. Then, the voltage waveform such as FIG. 7B is shown in the line 101. A resistor 46 converts magnetic current induced in the secondary side of the transformer 44 into a voltage, which is generated with the waveform such as FIG. 7C in the line 105. The voltage of the line 105 appears in the line 106 without negative voltage, as shown in FIG. 7D, through a diode 48, and is supplied to the current sensing terminal $I_{SENSE}$ of the switching control unit 16 through the resistor 52 as a current sensing voltage having the waveform such as FIG. 7E. A resistor 50 stabilizes the voltage of the line 106.

In this case, the power proportional to the current flowing through the switching unit 18 is consumed also in the resistor 46, so that heat loss is generated. For instance, when a maximum magnetic current Imax where the current sensing voltage becomes 1 V, is 150 mA and a resistance $R_{46}$ of resistor 46 is 15Ω, the maximum voltage $V_{105}$ in the line 105 is given by the following equation (3):

$$i\ V_{105} = 150 \times 10^{-3} \times 15 = 2.25 V \quad (3)$$

Thus, when the duty D of PWM signal is 0.8, the power consumption Pt dissipated in the resistor 46 is given by the following equation (4):

$$Pt = I^2 \cdot R \cdot t \quad (4)$$
$$= Imax^2 \times R_{46} \times D$$
$$= (150 \times 10^{-3})^2 \times 15 \times 0.8 = 270 \text{ mW}$$

That is, the loss of 270 mW which is greatly reduced compared with the circuit of FIG. 4 is generated to obtain the current sensing voltage of 1 V. However, according to the use of magnetic element, the following problems are generated. First, the number of steps in manufacturing of products is increased and the automatic insert machine cannot be used. Secondly, in the design of the magnetic element, saturation of magnetic core should be considered, so that its realization is difficult.

As described above, in SMPS, since the conventional current sensing circuit uses a resistor element or a magnetic element to sense current state, the above-mentioned problems are generated and also there is another problem of causing a false operation since noise level with respect to large current is transferred as a current sensing voltage, as it is, during the transfer of current sensing voltage.

SUMMARY OF THE INVENTION

Accordingly, it is an object of the present invention to provide a small signal level shift circuit which can solve the aforementioned problems.

It is another object of the present invention to provide a small signal level shift circuit which can exactly and precisely control a device by shifting a small signal by a predetermined level without distortion.

It is still another object of the present invention to provide a small signal level shift circuit which can prevent a false operation of a device by reducing noise level generated during transmitting signal.

It is yet another object of the present invention to provide a small signal level shift circuit which can minimize heat loss by controlling the sensing of large current only by a small signal, in a current sensing circuit of SMPS.

It is yet still another object of the present invention to provide a small signal level shift circuit which can sense current without using a resistor element or a magnetic element having large rated dissipation.

(*To achieve the objects, the present invention comprises signal coupling means for DC-coupling a signal generated from a signal source and level shift means for shifting the DC-coupled signal by a predetermined shift level.*)

BRIEF DESCRIPTION OF THE DRAWINGS

For a better understanding of the invention and to show how the same may be carried into effect, reference will now be made, by way of example, to the accompanying diagrammatic drawings, in which:

FIG. 11 is a circuit diagram as an example where the level shift circuit according to the present invention is applied to that of FIG. 3; and FIGS. 12A to 12D are waveforms at the respective circuit of FIG. 11 according to the present invention.

DETAILED DESCRIPTION OF THE INVENTION

Figure 8:
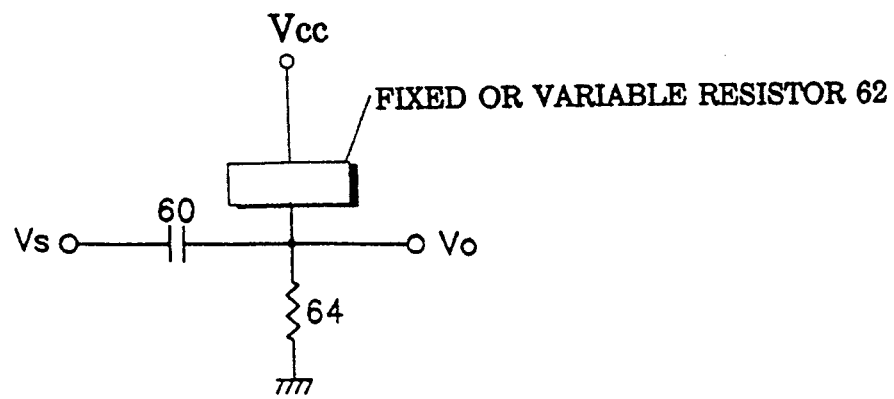
FIG. 8 is a level shift circuit of an embodiment according to the present invention.

Referring to FIG. 8, resistors 62 and 64 are serially coupled between a power source voltage Vcc and a ground, and constantly divide the power source voltage Vcc. A capacitor 60 which is a capacitive element is coupled between a signal source Vs and a connection point of the resistors 62 and 64, and DC-couples the signal Vs. An output signal Vo is obtained at the connection point of the resistors 62 and 64.

Figure 9A:
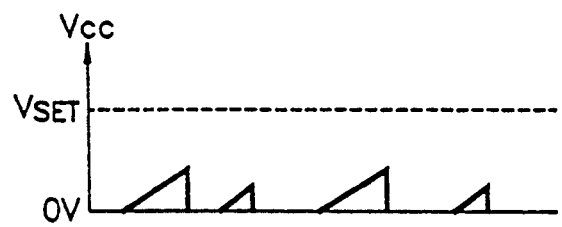
FIGS. 9A and 9B are waveforms of FIG. 8 according to the present invention.
Figure 9B:
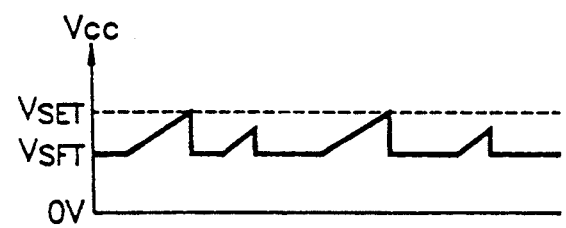

An operational example of FIG. 8 is described with reference to the waveform view of FIG. 9 as follows. Assuming that the signal Vs generated from a signal source is such as that of FIG. 9A, the signal Vs appears as a level-shifted signal Vo such as FIG. 9B by being shifted by a shift level set by resistors 62 and 64 through the capacitor 60. That is, the signal Vs is shifted to a set voltage level $V_{SET}$. The shift level $V_{SFT}$ is given by the following equation (5) according to resistances $R_{62}$ and $R_{64}$ of resistors 62 and 64. That is, $$V_{SFT} = \{R_{64}/(R_{62}+R_{64})\} \times Vcc \qquad (5)$$

And, the level shifted output signal Vo is given by the following equation (6):

$$Vo = Vs + \{R_{64}/(R_{62}+R_{64})\} \times Vcc \qquad (6)$$

Accordingly, when the output signal Vo is equal to or smaller than the power source voltage Vcc, the resistances of resistors 62 and 64 can be adjusted, thereby shifting the level of signal Vs to a desired level. As described above, the circuit of FIG. 8 does not amplify the level of signal Vs generated from a signal source and shifts only the level, so that the distortion of signal or the increase of noise level is prevented, thereby preventing a false operation of device. Also, the signal Vs of a very small level can be shifted. Here, the capacitor 60 performs the DC cut-off between the signal source and the resistors 62 and 64, thereby preventing the shift level voltage from being supplied to the signal source.

Figure 10:
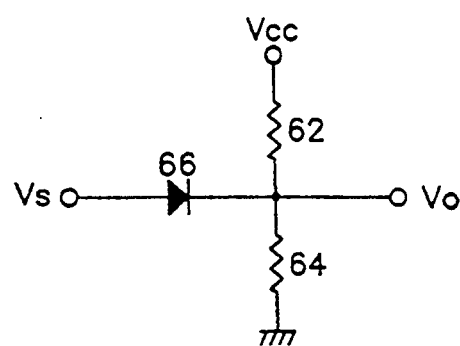
FIG. 10 is a level shift circuit of another embodiment according to the present invention.

FIG. 10 is a level shift circuit of another embodiment according to the present invention, which is an example of replacing the capacitor 60 of FIG. 8 by a diode 66 which is a DC cut-off element. Accordingly, the resistors 62 and 64 are the same as those of FIG. 8, and the diode 66 is forwardly coupled to a connection point between resistors 62 and 64 from the signal source Vs. Accordingly, the diode 66 performs the DC-cut off of the signal source side from the resistors 62 and 64, thereby preventing the shift level voltage from being supplied to the signal source side.

Figure 1:
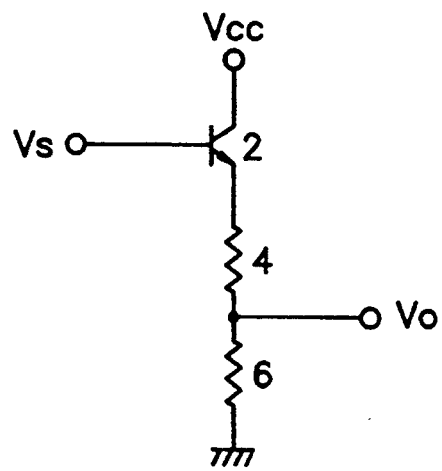
FIG. 1 is a conventional level shift circuit.
Figure 2A:
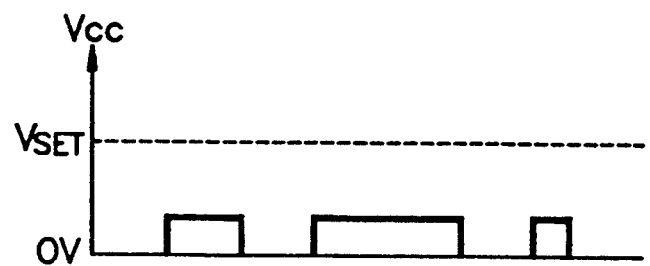
FIGS. 2A and 2B are waveforms according to operation of FIG. 1.
Figure 2B:
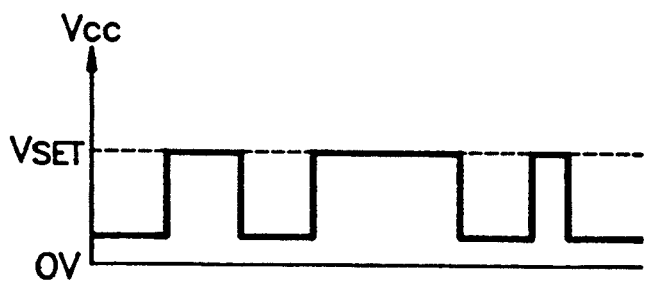
Figure 3:
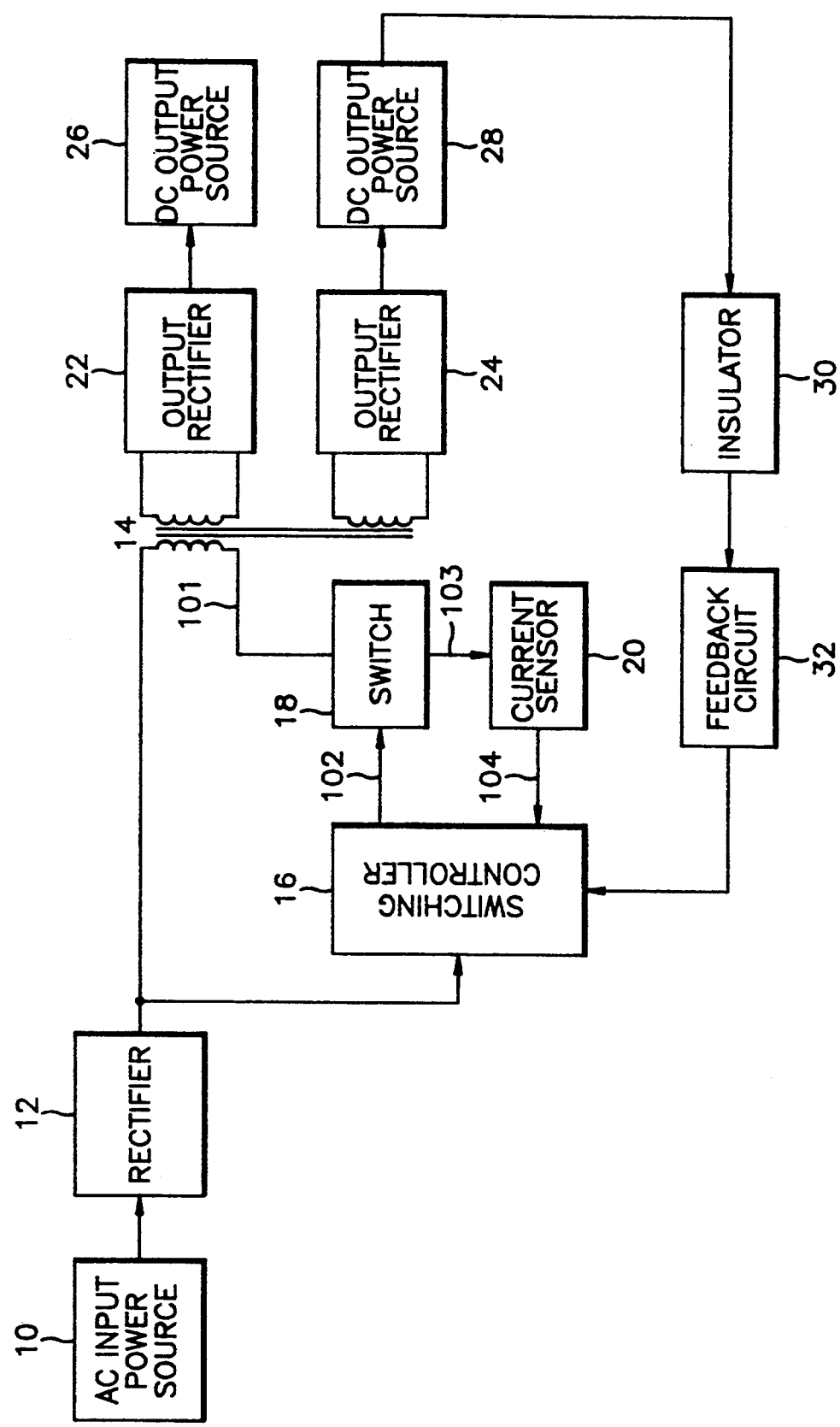
FIG. 3 is a block diagram of a general switching mode power supply.

Meanwhile, FIG. 11 shows an example where the level shift circuit of FIG. 8 according to the present invention is applied in the current sensing circuit 20 of SMPS shown in FIG. 3. In FIG. 11, a resistor 70 is coupled between the switching unit 18 and a ground. The resistor 70 is a current sensing resistor, which converts the current flowing through the switching unit 18 into a voltage of level corresponding to the current. A capacitor 72 is coupled between a connection point of switching unit 18 and resistor 70, and a connection point of resistors 74 and 76, and DC-couples the converted voltage level. The resistors 74 and 76 are serially coupled between a reference voltage terminal Vref of the switching control unit 16 and a ground, and constantly divide the reference voltage to set a shift level. Also, the connection point of resistors 74 and 76 are coupled between the capacitor 72 and a current sensing terminal $I_{SENSE}$ of the switching control unit 16. Here, the level shift circuit 78 having the capacitor 72 and the resistors 74 and 76 corresponds to that of FIG. 8. The switching control unit 16, the switching unit 18, the current sensing circuit 80 and the lines 101 to 104 correspond to the corresponding circuits of FIGS. 3 and 4 described above, respectively.

In FIG. 11, contrarily to the conventional one, the resistance of resistor 70 is set to a very small value, thereby generating in the line 103 a small voltage level, which is shifted by the shift level through the capacitor 72, and then is supplied to the current sensing terminal $I_{SENSE}$ of the switching control unit 16 as a current sensing voltage.

Figure 4:
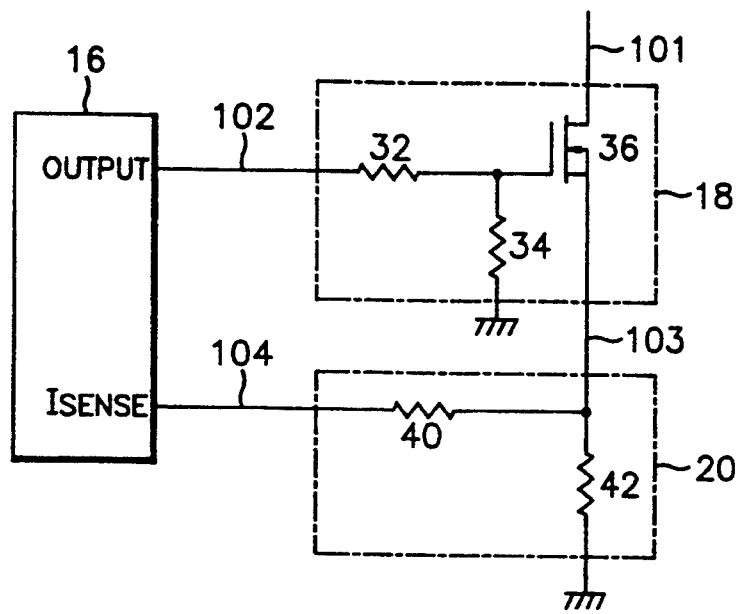
FIG. 4 is a current sensing circuit according to a conventional embodiment.
Figure 5A:
FIGS. 5A to 5D are waveforms at the respective circuits of FIG. 4.
Figure 5B:
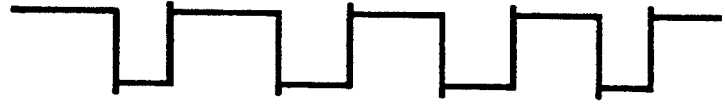
Figure 5C:
Figure 5D:
Figure 6:
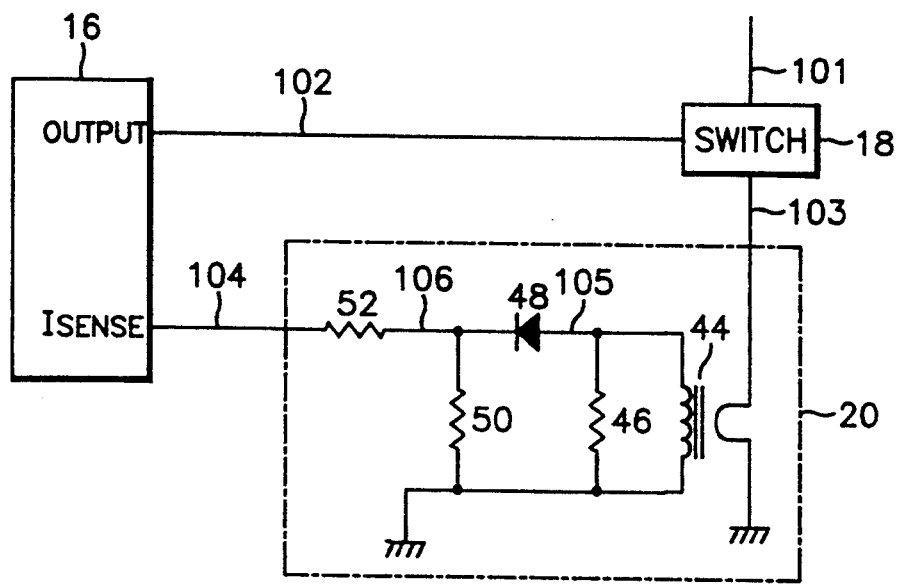
FIG. 6 is a current sensing circuit according to another conventional embodiment.
Figure 7A:
FIGS. 7A to 7E are waveforms at the respective circuits of FIG. 6.
Figure 7B:
Figure 7C:
Figure 7D:
Figure 7E:
Figure 12A:
Figure 12B:

Meanwhile, a reference voltage Vref of generally 5.1 V ($\pm 1\%$) is generated in a reference voltage terminal Vref of the switching control unit 16. Accordingly, assuming that the shut-down voltage of the switching control unit 16 is set to 1.0 V as described above, for example, the shift level is set to 0.95 V. In this state, if the current sensing voltage of line 103 generated in the resistor 70 reaches 0.05 V, it becomes 1.0 V by being shifted by the shift level 0.95 V through the capacitor 72, and is supplied to the current sensing terminal $I_{SENSE}$ of the switching control unit 16. Accordingly, the switching control unit 16 senses overcurrent state and is shut down, thereby stopping the generation of PWM signal to protect the load or SMPS from overcurrent. Here, when the PWM signal outputted in the switching control unit 16 is identical to that of FIG. 12A, voltage waveform such as FIG. 12B appears in the line 101, and voltage waveform such as FIG. 12C appears by the resistor 70 in the line 103. The voltage of the line 103 is shifted by the shift level, and is generated in line 104 as a current sensing voltage such as FIG. 12D. At this time, if it is assumed that the maximum current Ismax where the current sensing voltage becomes 1 V is set to be 15A as shown in FIG. 4, the resistance $R_{70}$ of the resistor 70 is determined as 50 mV/15 A = 3.3 m$\Omega$. In this state, when the duty D of PWM signal is 0.8 as in the above case, the power consumption Pt of the resistor 70 is given by the following equation (7):

$$\begin{aligned} Pt &= I^2 \cdot R \cdot t \\ &= Ismax^2 \times R_{70} \times D \\ &= 15^2 \times (3.3 \times 10^{-3}) \times 0.8 = 0.6 \text{ W} \end{aligned} \qquad (7)$$

That is, to obtain the current sensing voltage of 1 V, the loss of 0.6 W is generated, so that the loss is greatly reduced, compared with the aforementioned circuit of FIG. 4. Accordingly, even if large current is sensed, the heat loss is minimized, thereby improving the efficiency of SMPS, and the current can be sensed without using a resistor element or a magnetic element of rated dissipation. Moreover, noise level is reduced, and also, current can be exactly and precisely limited without distortion.

While the aforementioned description of the present invention describes a preferred embodiment, several variations can be made without departing from the spirit of the invention. Particularly, FIG. 8 illustrates that the shift level is set using only two resistors 62 and 64, but the shift level can be set by dividing a power source voltage Vcc by a plurality of resistors, and can be differently set using a variable resistor as shown in FIG. 8, if necessary. Similarly, only one capacitor 60 of FIG. 8 or one diode of FIG. 10 is used in the present invention, but a plurality of capacitors or diodes can be used if necessary, and other capacitive element or one-directional DC cut off means can be used. **Also, FIG. 11 illustrates that a shift level is set from a reference voltage of switching control unit 16. But, the shift level can be set by dividing a power source voltage as shown in FIG. 8 and instead of using the level shift circuit of FIG. 8, that of FIG. 10 can be used to obtain the same effect.

As described above, according to the present invention, a variation of small signal is transmitted without distortion and fine control can be made, thereby exactly and precisely controlling a device. Also, there is an advantage of preventing a false operation of device by reducing noise level in signal transmission process. Also, in SMPS, even if large current is sensed, heat loss is minimized, thereby improving the efficiency of SMPS, and a resistor element or a magnetic element of rated dissipation is not used, thereby realizing the miniaturization of device and the cost reduction. Also, current can be exactly and precisely limited by reducing noise level and being transmitted without distortion.

While the invention has been particularly shown and described with reference to a preferred embodiment, it will be understood by those skilled in the art that modifications in detail may be made without departing from the spirit and scope of the invention.

What is claimed is:

1. A current sensing circuit of a switching mode power supply, comprising:
    a switching means for generating a switched current by switching a rectified alternating current supplied to a primary side of a transformer in response to a pulse width modulation signal, to enable said rectified alternating current supplied to said primary side of said transformer energize a secondary side of said transformer;
    a current sensing means for convening said switched current into a sensed voltage corresponding to said switched current level;
    a switching control means for generating said pulse width modulation signal and receiving a current sensing voltage to determine whether said switched current is above a regulated value to disable said switching means when said switched current is above said regulated value;
    a level shift means for generating said current sensing voltage by shifting said sensed voltage level by a predetermined shift level, and supplying said current sensing voltage to said switching control means; and
    a signal coupling means positioned in series between said level shift means and a signal source terminal coupled between said switching means and said current sensing means, for preventing direct current components generated by the level shift means from being supplied to said signal source terminal.

2. A current sensing circuit of a switching mode power supply as claimed in claim 1, wherein said signal coupling means comprises at least one capacitive means serially connected between said current sensing means and said level shift means.

3. A current sensing circuit of a switching mode power supply as claimed in claim 2, wherein said capacitive means is a capacitor.

4. A current sensing circuit of a switching mode power supply as claimed in claim 1, wherein said signal coupling means comprises at least one diode forwardly coupled from said current sensing means to said level shift means.

5. A current sensing circuit of a switching mode power supply as claimed in claim 1, wherein said level shift means comprises at least two resistors for dividing a power source voltage.

6. A current sensing circuit of a switching mode power supply as claimed in claim 5, wherein as least one of said resistor comprises a variable resistor.

7. A current sensing circuit of a switching mode power supply, comprising:
    a switching means for generating a switched current by switching a rectified alternating current supplied to a primary side of a transformer in response to a pulse width modulation signal, said rectified alternating current supplied to said primary side of said transformer energizing a secondary side of said transformer;
    a current sensing means for converting said switched current into a sensed voltage corresponding to said switched current level;
    a switching control means for generating said pulse width modulation signal and receiving a current sensing voltage to determine whether said switched current is above a regulated value to disable said switching means when said switched current is above said regulated value;
    a level shift means for generating said current sensing voltage by dividing a reference voltage generated from said switching control means and shifting said sensed voltage level by a predetermined shift level, and supplying said current sensing voltage to said switching control means; and
    a signal coupling means positioned in series between said level shift means and a signal source terminal coupled between said switching means and said current sensing means, for preventing direct current components generated by the level shift means from being supplied to said signal source terminal.

8. A current sensing circuit of a switching mode power supply as claimed in claim 7, wherein said signal coupling means comprises at least one direct current cut off means for disconnecting said current sensing means from said level shift means.

9. A current sensing current sensing circuit of a switching mode power supply as claimed in claim 8, wherein said direct current cut off means is a capacitor, 10. A current sensing circuit of a switching mode power supply as claimed in claim 7, wherein said signal coupling means comprises at least one backward voltage cut off means for disconnecting said shift level from said current sensing means.

11. A current sensing circuit of a switching mode power supply as claimed in claim 10, wherein said backward voltage cut off means comprises a diode forwardly coupled from said current sensing means to said level shift means.

12. A current sensing circuit of a switching mode power supply as claimed in claim 7, wherein said level shift means comprises at least two resistors serially coupled between a reference voltage of said switching control means and a ground.

13. A current sensing circuit of a switching mode power supply as claimed in claim 12, wherein at least one of said resistors comprises a variable resistor element.

14. A current sensing circuit of a switching mode power supply as claimed in claim 4, wherein said level shift means comprises at least two resistors for dividing a power source voltage.

15. A current sensing circuit of a switching mode power supply as claimed in claim 8, wherein said level shift means comprises at least two resistors serially coupled between a reference voltage of said switching control means and a ground.

16. A current sensing circuit of a switching mode power supply as claimed in claim 9, wherein said level shift means comprises at least two resistors serially coupled between a reference voltage of said switching control means and a ground.

17. A current sensing circuit of a switching mode power supply as claimed in claim 10, wherein said level shift means comprises at least two resistors serially coupled between a reference voltage of said switching control means and a ground.

18. A current sensing circuit of a switching mode power supply as claimed in claim 11, wherein said level shift means comprises at least two resistors serially coupled between a reference voltage of said switching control means and a ground.

19. A level shift means as claimed in claim 5, wherein a first resistor of said resistors is coupled between said power source voltage and a terminal located between said switching control means and said signal coupling means, and a second resistor of said resistors is coupled between said terminal and a ground potential.

* * * * *

UNITED STATES PATENT AND TRADEMARK OFFICE
CERTIFICATE OF CORRECTION

PATENT NO. : 5,377,093
DATED : December 27, 1994
INVENTOR(S): Lee, et al

It is certified that error appears in the above-indentified patent and that said Letters Patent is hereby corrected as shown below:

IN THE CLAIMS

Claim 1  Column 7,  Line 43, change "convening" to --converting--:

Signed and Sealed this

Twenty-ninth Day of April, 1997

Attest:

BRUCE LEHMAN

Attesting Officer

Commissioner of Patents and Trademarks